(12) United States Patent
Yan

(10) Patent No.: US 11,425,519 B2
(45) Date of Patent: Aug. 23, 2022

(54) METHOD FOR DETECTING BLOCKING OF MICROPHONE AND RELATED PRODUCTS

(71) Applicant: GUANGDONG OPPO MOBILE TELECOMMUNICATIONS CORP., LTD., Guangdong (CN)

(72) Inventor: Congwei Yan, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/154,343

(22) Filed: Jan. 21, 2021

(65) Prior Publication Data
US 2021/0144498 A1    May 13, 2021

Related U.S. Application Data

(63) Continuation of application No. PCT/CN2019/088611, filed on May 27, 2019.

(30) Foreign Application Priority Data

Jul. 26, 2018  (CN) .......................... 201810841652.6

(51) Int. Cl.
*H04R 29/00* (2006.01)
*G10L 15/18* (2013.01)
(Continued)

(52) U.S. Cl.
CPC ........ *H04R 29/005* (2013.01); *G10L 15/1815* (2013.01); *G10L 15/22* (2013.01);
(Continued)

(58) Field of Classification Search
CPC ...... H04R 29/005; H04R 1/08; H04R 1/1016; H04R 1/1041; H04R 1/406; H04R 3/005;
(Continued)

(56) References Cited

U.S. PATENT DOCUMENTS

| 2016/0050488 A1* | 2/2016 | Matheja | ................... | H04R 3/00 381/56 |
| 2016/0073211 A1 | 3/2016 | Zaman | | |

(Continued)

FOREIGN PATENT DOCUMENTS

| CN | 104012111 A | 8/2014 |
| CN | 105848052 A | 8/2016 |

(Continued)

OTHER PUBLICATIONS

Sun Hongyuan et al., On PZT Sensors as Signal Receivers and the Speech Features dated Dec. 31, 2003. (5 pages).

(Continued)

*Primary Examiner* — William A Jerez Lora
(74) *Attorney, Agent, or Firm* — Young Basile Hanlon & MacFarlane, P.C.

(57) ABSTRACT

A method for detecting blocking of a microphone and related products are provided. The method includes the following. Voice data is collected through a microphone of the first wireless earphone. Whether the voice data has a missing voice segment is detected. The microphone (e.g., microphone-hole) of the first wireless earphone is determined to be blocked in response to detecting that the voice data has the missing voice segment.

16 Claims, 4 Drawing Sheets

(51) Int. Cl.
*G10L 15/22* (2006.01)
*G10L 25/51* (2013.01)
*H04R 1/08* (2006.01)
*H04R 1/10* (2006.01)
*H04R 1/40* (2006.01)
*H04R 3/00* (2006.01)

(52) U.S. Cl.
CPC ............... *G10L 25/51* (2013.01); *H04R 1/08* (2013.01); *H04R 1/1016* (2013.01); *H04R 1/1041* (2013.01); *H04R 1/406* (2013.01); *H04R 3/005* (2013.01); *H04R 2420/07* (2013.01)

(58) Field of Classification Search
CPC . H04R 2420/07; G10L 15/1815; G10L 15/22; G10L 25/51
USPC .................................. 381/56, 58, 74, 91, 370
See application file for complete search history.

(56) References Cited

U.S. PATENT DOCUMENTS

| | | | |
|---|---|---|---|
| 2018/0047414 A1 | 2/2018 | Kasilya Sudarsan et al. | |
| 2019/0014429 A1* | 1/2019 | Luke | H04R 29/005 |
| 2019/0387304 A1* | 12/2019 | Song | G06F 3/165 |

FOREIGN PATENT DOCUMENTS

| | | |
|---|---|---|
| CN | 106303804 A | 1/2017 |
| CN | 106911996 A | 6/2017 |
| CN | 107205204 A | 9/2017 |
| CN | 107889044 A | 4/2018 |
| CN | 107959903 A | 4/2018 |
| EP | 1467595 A2 | 10/2004 |
| JP | 2002159086 A | 5/2002 |
| WO | 2014037766 A1 | 3/2014 |
| WO | 2014055312 A1 | 4/2014 |

OTHER PUBLICATIONS

Chinese Second Office Action with English Translation for CN Application 202010138532.7 dated Aug. 23, 2021. (20 pages).
Extended European Search Report for EP Application 19841155.5 dated Aug. 23, 2021. (9 pages).
First Office Action with English Translation issued in corresponding CN application No. 201810841652.6 dated Sep. 4, 2019.
Notification to Grant Patent Right for Invention with English Translation issued in corresponding CN application No. 201810841652.6 dated Dec. 18, 2019.
International search report with English Translation issued in corresponding international application No. PCT/CN2019/088611 dated Jul. 31, 2019.

\* cited by examiner

METHOD FOR DETECTING BLOCKING OF MICROPHONE AND RELATED PRODUCTS

CROSS-REFERENCE TO RELATED APPLICATION(S)

This application is a continuation of International Application No. PCT/CN2019/088611, filed on May 27, 2019, which claims priority to Chinese Patent Application No. 2018108416526, filed on Jul. 26, 2018, the entire disclosures of which are incorporated herein by reference.

TECHNICAL FIELD

This disclosure relates to the field of wireless earphone technology, and more particularly to a method for detecting blocking of a microphone and related products.

BACKGROUND

With wide spread and rapid development of mobile terminals (e.g., smart phones), various earphones are often used to listen to media. Moreover, an earphone cable of a wired earphone is often damaged, which results to a short life and high cost of the earphone, and wireless earphones come into being.

Currently, it is found that a hole of a microphone of a wireless earphone is often blocked, by such as dust, water droplets, etc., which results to intermittence and low volume of voice data obtained through the microphone of the wireless earphone and affects normal use of the wireless earphone.

SUMMARY

Implementations provide a method for detecting blocking of a microphone and related products.

In a first aspect, a method for detecting blocking of a microphone is provided. The method is applicable to a first wireless earphone that is in communication with a mobile terminal and a second wireless earphone. The method includes the following. Voice data is collected through a microphone of the first wireless earphone. Whether the voice data has a missing voice segment is detected. The microphone (e.g., microphone-hole) of the first wireless earphone is determined to be blocked in response to detecting that the voice data has the missing voice segment.

In a second aspect, an apparatus for detecting blocking of a microphone is provided. The apparatus is applicable to a first wireless earphone that is in communication with a mobile terminal and a second wireless earphone. The apparatus includes a processing unit and a communication unit. The processing unit is configured to collect through a microphone of the first wireless earphone voice data; detect whether the voice data has a missing voice segment; determine that the microphone of the first wireless earphone is blocked in response to detecting that the voice data has the missing voice segment.

In a third aspect, a first wireless earphone is provided. The first wireless earphone includes a processor, a memory, and one or more programs stored in the memory and executed by the processor. The one or more programs include instructions for performing the method described in the first aspect.

In a fourth aspect, a non-transitory computer-readable storage medium is provided. The non-transitory computer-readable storage medium is configured to store computer programs for electronic data interchange (EDI). The computer programs include instructions for performing some or all operations of the method described in the first aspect.

In a fifth aspect, a computer program product is provided. The computer program product includes a non-transitory computer-readable storage medium that stores computer programs. The computer programs are operable with a computer to execute some or all operations of the method described in the first aspect. The computer program product may be a software installation package.

BRIEF DESCRIPTION OF DRAWINGS

In order to describe technical solutions of implementations more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

In order for those skilled in the art to better understand technical solutions of implementations, technical solutions of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

The terms "first", "second", "third", and the like used in the specification, the claims, and the accompany drawings of the disclosure are used to distinguish different objects rather than describe a particular order. The terms "include", "include", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1:
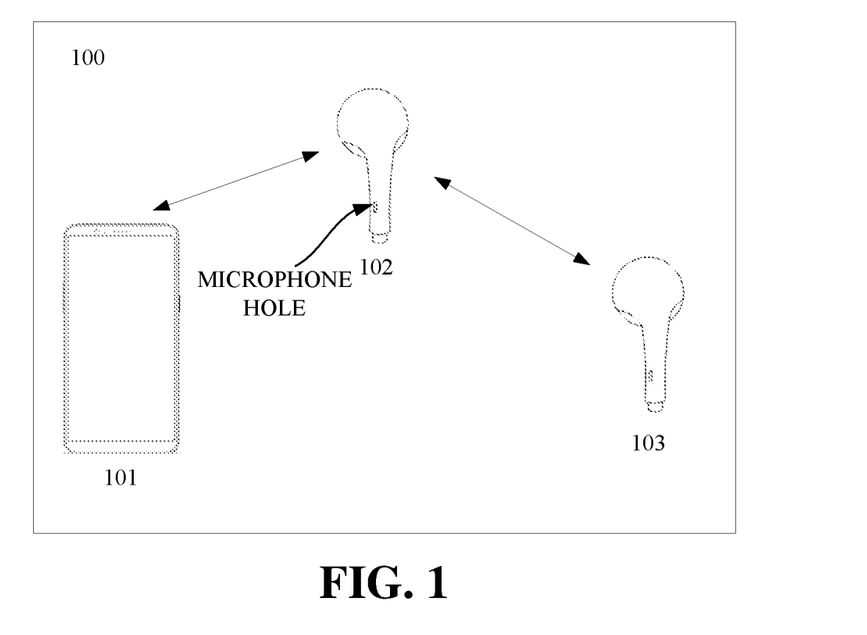
FIG. 1 is a schematic structural diagram of a first wireless earphone system according to implementations.

Implementations of the present disclosure provide a first wireless earphone system 100. As illustrated in FIG. 1, the system includes a mobile terminal 101, a first wireless earphone 102, and a second wireless earphone 103. A first communication link is established between the mobile terminal 101 and the first wireless earphone 102, and a second communication link is established between the first wireless earphone 102 and the second wireless earphone 103, that is, communications between the first wireless earphone 102 and the mobile terminal 101 and between the second wireless earphone 103 and the mobile terminal 101 adopt a master-slave communication mechanism (specifically, a Bluetooth protocol can be used). A master earphone can directly establish a communication link with the mobile terminal 101 and exchange data of a preset type with the mobile terminal 101. A slave earphone can exchange data of the preset type with the mobile terminal 101 through a transfer of the master earphone. Data of the preset type includes at least one of media data and call data, where the media data is at least one of audio data and video data of the mobile terminal 101 other than call voice data, and the call data is the call voice data of the mobile terminal 101. The first wireless earphone 102 and the second wireless earphone 103 may be Bluetooth wireless earphones and the like. The mobile terminal 101 may include various handheld devices, in-vehicle devices, wearable devices (such as smart watches, smart bracelets, pedometers, etc.), computing devices that have wireless communication functions or other processing devices connected to a wireless modem, as well as various forms of user equipments (UE), mobile stations (MS), terminal devices, and the like. For ease of description, the above-mentioned devices are collectively referred to as a mobile terminal. Hereinafter, detailed description of implementations of the present disclosure will be given below.

Figure 2:
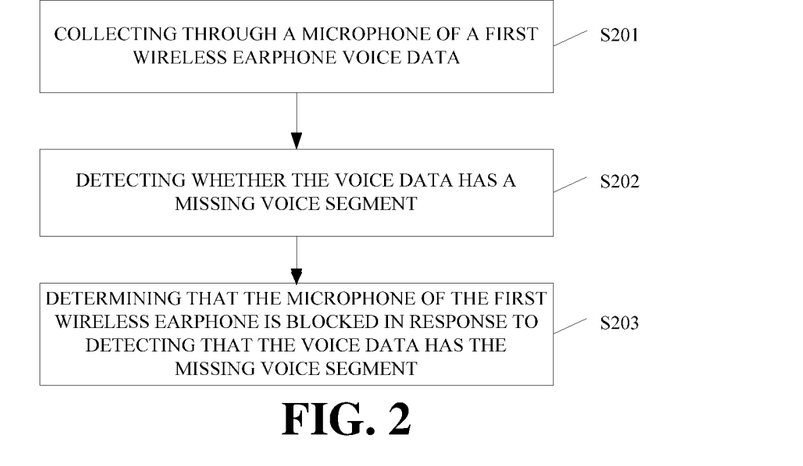
FIG. 2 is a schematic flowchart of a method for detecting blocking of a microphone according to implementations.

FIG. 2 is a schematic flowchart of a method for detecting blocking of a microphone according to implementations. The method is applicable to a first wireless earphone and the first wireless earphone is in communication with a second wireless earphone and a mobile terminal. As illustrated in FIG. 2, the method for detecting blocking of a microphone includes the following.

S201, the first wireless earphone collects through a microphone of the first wireless earphone voice data.

The voice data may be voice data with a change in volume output by a target sound source, and the target sound source includes a user or other audio playback devices, which is not limited herein.

S202, the first wireless earphone detects whether the voice data has a missing voice segment.

The voice segment includes a word, a phrase, or a sentence, the voice segment can be determined from the voice data according to at least one of: the length of an interval between voice and existence of valid voice information, which is not limited herein.

S203, the first wireless earphone determines that the microphone of the first wireless earphone is blocked in response to detecting that the voice data has the missing voice segment.

It can be seen that, in this implementation, the first wireless earphone first collects through the microphone of the first wireless earphone the voice data. The first wireless earphone then detects whether the voice data has the missing voice segment. Finally, the first wireless earphone determines that the microphone of the first wireless earphone is blocked in response to detecting that the voice data has the missing voice segment. As such the first wireless earphone acquires through the microphone the voice data, and can determine that the microphone of the first wireless earphone is blocked quickly and accurately by analyzing whether the voice data is intermittent, that is, by analyzing existence of the missing voice segment, which is beneficial to improve convenience of blocking detection. Moreover, due to universality of the voice data, detecting blocking by collecting the voice data is beneficial to improve time flexibility of blocking detection. In addition, the entire detecting process is performed by the wireless earphone autonomously, which realizes automatic blocking detection of the wireless earphone microphone. In the meantime, blocking of the microphone can be detected without increasing a hardware structure, which expands functions of the wireless earphone and improves intelligence of blocking detection.

As an implementation, the first wireless earphone detects whether the voice data has the missing voice segment as follows. The first wireless earphone determines multiple voice segments in the voice data, where an interval between any two adjacent voice segments is longer than a preset time length, and voice data corresponding to the interval between the any two adjacent voice segments has no valid voice information. The first wireless earphone detects whether the voice data has the missing voice segment according to semantic coherence of the multiple voice segments.

The first time length may be 200 ms, 300 ms, etc, and the first time length can be obtained by intelligent analysis based on user's historical voice data. The first time length is used to reflect a habit of user's intermittence during speaking, and determine the voice segments accurately.

It can be seen that, in this implementation, when the microphone collects audio data, since the volume of sound needs to be within a certain volume range and the user itself speaks intermittently, both of these two situations can lead to voice segments. Therefore when the voice data collected is analyzed, all voice segments need to be screened out accurately by constraining a filtering condition using a time length of an interval and existence of voice information. Furthermore, based on practical voice analysis, a voice segment due to other than intermittent characteristics of the user during speaking is further filtered out. Finally, whether the voice data has the missing voice segment caused by blocking is detected. In this way, accuracy of blocking detection can be improved.

As an implementation, the first wireless earphone detects whether the voice data has the missing voice segment according to semantic coherence of the multiple voice segments as follows. The first wireless earphone acquires at least one voice segment group with missing semantics from the multiple voice segments, where each of the at least one voice segment group includes two adjacent voice segments. The first wireless earphone determines a lowest volume of voice data in each voice segment group. The first wireless earphone determines a first minimum volume of the voice data collected through the microphone according to the lowest volume of the voice data in the each voice segment group, where the first minimum volume is indicative of an actual sound-pickup capability of the microphone of the first wireless earphone. The first wireless earphone acquires a second minimum volume of the microphone of the first wireless earphone, where the second minimum volume is indicative of a reference sound-pickup capability of the microphone of the first wireless earphone when the microphone is not blocked. The second minimum volume of the microphone of the first wireless earphone may be preset in the first wireless earphone by default (e.g., factory settings). The first wireless earphone determines that the voice data has the missing voice segment when the first lowest volume does not match the second lowest volume. The first wireless earphone determines that the voice data does not have the missing voice segment when the first lowest volume matches the second lowest volume.

For an example, the first wireless earphone acquires the at least one voice segment group with missing semantics from the multiple voice segments as follows. The first wireless earphone converts the multiple voice segments in the voice data into multiple text segments and determines at least one text segment group with missing semantics from the multiple text segments, where each of the at least one text segment group includes two adjacent text segments. Voice segment group corresponding to the at least one text segment group with missing semantics can be seen as the at least one voice segment group with missing semantics.

When the microphone is blocked, sound signal of external voice data will be attenuated due to blockage of an obstruction, as such a volume range of sound signal that can be collected by the microphone is narrowed, that is, before the microphone is blocked, sound with the second lowest volume can be collected, after the microphone is blocked, the lowest volume of sound that can be collected is the first lowest volume. In this way, whether the voice data has the missing voice segment caused by blocking is detected, so as to determine that the microphone is blocked.

It can be seen that, in this implementation, the first wireless earphone can obtain the at least one voice segment group based on semantics analysis, accurately calculate the first lowest volume of the voice data according to the lowest volume of the each voice segment group, and then compare the first lowest volume with the second lowest volume directly. As such, by acquiring the at least one voice segment group with missing semantics from the multiple voice segments and detecting that the first lowest volume does not match the second lowest volume, the first wireless earphone can detect whether the voice data has the missing voice segment caused by blocking the microphone more accurately, so that accuracy of blocking detection can be improved.

As an implementation, the first wireless earphone detects whether the voice data has the missing voice segment as follows. The first wireless earphone acquires valid semantic information of the voice data. The first wireless earphone determines a first lowest volume of the voice data according to voice data corresponding to the valid semantic information, where the first minimum volume is indicative of an actual sound-pickup capability of the microphone of the first wireless earphone. The first wireless earphone acquires a second minimum volume of the microphone of the first wireless earphone, where the second minimum volume is indicative of a reference sound-pickup capability of the microphone of the first wireless earphone when the microphone is not blocked. When the first lowest volume does not match the second lowest volume, the first wireless earphone determines that the voice data has the missing voice segment. When the first lowest volume matches the second lowest volume, the first wireless earphone determines that the voice data does not have the missing voice segment.

When the voice data collected by the microphone of the first wireless earphone is converted into texts, a part of the voice data can be converted into texts, the rest part of the voice data is unable to be converted into texts because the rest part of the voice data may correspond to environmental sound, an intermittence of the user during speaking and the like. In other words, the rest part of the voice data may correspond to a situation when the user is not speaking, or the user is not speaking but the voice data corresponding to the user' speech is unable to be collected due to blocking of the microphone. The valid semantic information can be texts into which the voice data collected by the microphone of the first wireless earphone is converted into is converted.

It can be seen that, in this implementation, the voice data collected by the microphone of the first wireless earphone includes voice data corresponding to the valid semantic information and voice data corresponding to the invalid semantic information. The valid semantic information includes part of the voice data with the lowest volume that can be collected by the microphone, the first wireless earphone can calculate the first lowest volume, which corresponds to an actual sound-pickup capability of the microphone during this collecting process, by processing the voice data. The first wireless earphone compares the second lowest volume corresponding to the reference sound-pickup capability of the microphone when the microphone is not blocked with the first lowest volume. As such, the microphone can be determined to be blocked accurately.

As an implementation, the first wireless earphone collects through the microphone of the first wireless earphone the voice data by collecting through the microphone of the first wireless earphone the voice data in response to detecting a first sound-pickup request and the first wireless earphone being worn.

It can be seen that, in this implementation, when a distance between a sound source and the microphone is changing, a volume of the voice data collected by the microphone will be affected by the changing distance. Therefore, in order to avoid an error caused by the changing distance between the sound source and the microphone, the first wireless earphone can accurately determine a scene in which the target sound source of the voice data collected by the microphone of the first wireless earphone is the user and the distance is relatively constant by detecting whether the first wireless earphone is worn, thereby reducing a detection error and improving accuracy of blocking detection.

As an implementation, the method includes the following after the first wireless earphone determines that the microphone of the first wireless earphone is blocked in response to detecting that the voice data has the missing voice segment. The first wireless earphone determines whether the second wireless earphone is worn in response to detecting a second sound-pickup request and the first wireless earphone being worn. The first wireless earphone disables a sound-pickup function of the microphone of the first wireless earphone and performing a second sound-pickup function through a microphone of the second wireless earphone, in response to detecting that the second wireless earphone is worn.

The second sound-pickup request can be detected in various ways, for example, the second sound-pickup request is detected by receiving a second sound-pickup request for voice data sent by the mobile terminal. The second sound-pickup request may be triggered by a user's long press operation on a designated button in a touch screen when a chat application (e.g., WeChat, QQ, etc.) is running in the foreground; for another example, the second sound-pickup request is detected through the first wireless earphone by detecting the user's operation such as touch or press, which is not limited here. The second sound-pickup request indicates that the user needs to record voice data.

The first wireless earphone can determine whether the second wireless earphone is worn through multiple proximity sensors or pressure sensors by detecting contact between the second wireless earphone and an auricle, or determine whether the second wireless earphone is worn according to a gesture parameter of the second wireless earphone, or determine whether the second wireless earphone is worn by detecting a communication identifier which is indicative of successful communication between the second wireless earphone and the mobile terminal, or determine whether the second wireless earphone is worn by detecting a music playback message corresponding to the second wireless earphone (which is used to instruct the second wireless earphone to play music), which are not limited here. The gesture parameter of the second wireless earphone can be determined by motion sensors such as a three-axis gyroscope, a three-axis accelerometer, a three-axis electronic compass, or a combination thereof. When a gesture parameter of the second wireless earphone matches a preset gesture parameter of the second wireless earphone which is worn, the second wireless earphone is determined to be worn.

It can be seen that, in this implementation, after the first wireless earphone is determined to be blocked, whether the second wireless earphone is worn is determined in response to the second sound-pickup request for voice data. When the second wireless earphone is worn, the second wireless earphone is switched to acquire voice data and a voice acquisition function of the first wireless earphone is disabled at the same time, which is beneficial to improve integrity of acquisition for voice data and reduce power consumption of the first wireless earphone.

As an implementation, the method includes the following. The first wireless earphone acquires a third distance between the first wireless earphone and the mobile terminal and a fourth distance between the first wireless earphone and the second wireless earphone, in response to detecting that the second wireless earphone is not worn. The first wireless earphone sends to the mobile terminal a notification message when the third distance is less than the fourth distance, where the notification message is used to notify the mobile terminal to perform the second sound-pickup function through a microphone of the mobile terminal.

It can be seen that, in this implementation, after the first wireless earphone is determined to be blocked, when the sound-pickup request for voice data is detected and the second wireless earphone is determined to be not worn, the mobile terminal that is closer to the first wireless earphone is determined and is notified to obtain voice data, which is beneficial to ensure clarity of acquisition for voice data.

Figure 3:
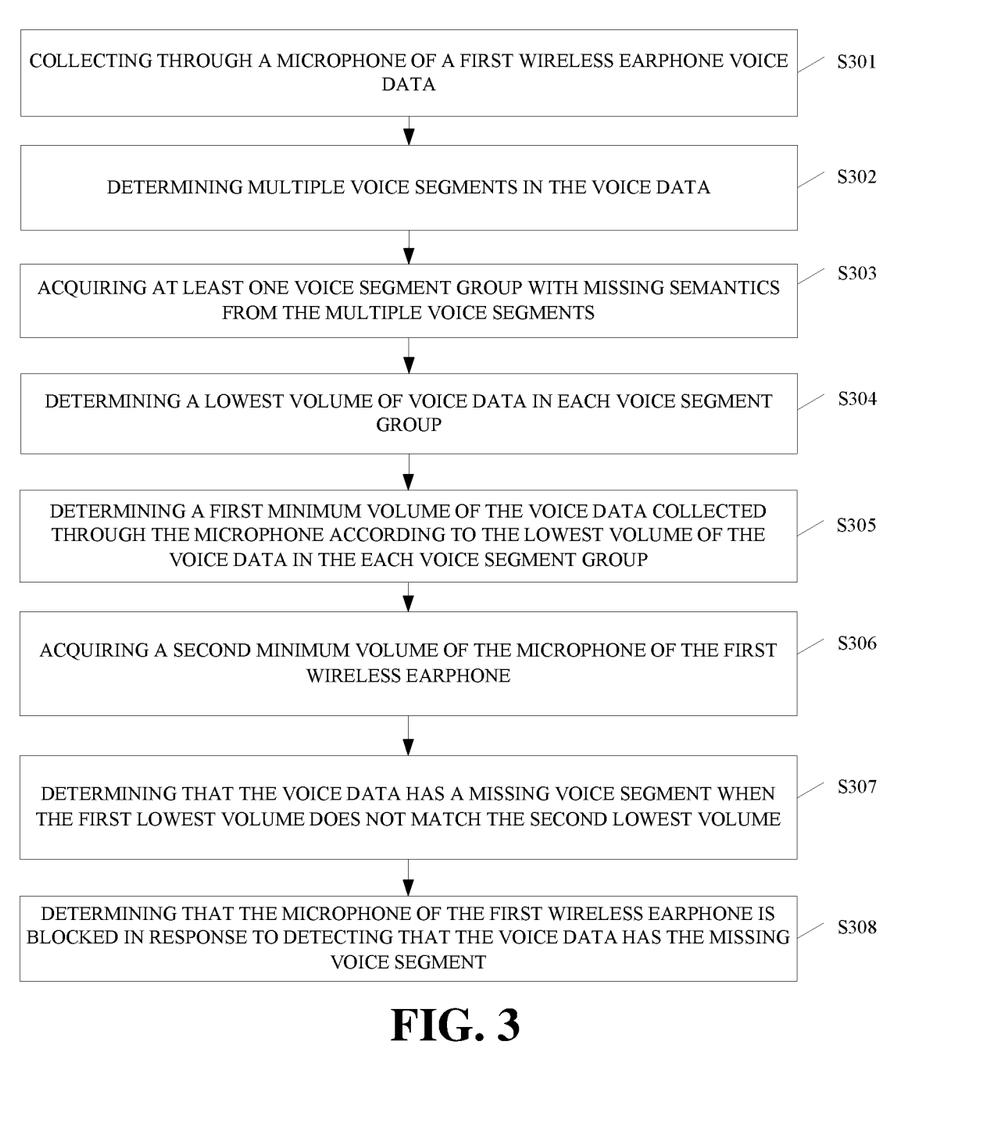
FIG. 3 is a schematic flowchart of a method for detecting blocking of a microphone according to other implementations.

Similar to implementations illustrated in FIG. 2, FIG. 3 is a schematic flowchart of a method for detecting blocking of a microphone according to implementations. The method is applicable to a first wireless earphone, and the first wireless earphone is in communication with a mobile terminal and the second wireless earphone. As illustrated in FIG. 3, the method for detecting blocking of a microphone includes the following.

S301, the first wireless earphone collects through a microphone of the first wireless earphone voice data.

S302, the first wireless earphone determines multiple voice segments in the voice data, where an interval between any two adjacent voice segments is longer than a preset time length, and voice data corresponding to the interval between the any two adjacent voice segments has no valid voice information.

S303, the first wireless earphone acquires at least one voice segment group with missing semantics from the multiple voice segments, where each of the at least one voice segment group includes two adjacent voice segments.

S304, the first wireless earphone determines a lowest volume of voice data in each voice segment group.

S305, the first wireless earphone determines a first minimum volume of the voice data collected through the microphone according to the lowest volume of the voice data in the each voice segment group, where the first minimum volume is indicative of an actual sound-pickup capability of the microphone of the first wireless earphone.

S306, the first wireless earphone acquires a second minimum volume of the microphone of the first wireless earphone, where the second minimum volume is indicative of a reference sound-pickup capability of the microphone of the first wireless earphone when the microphone is not blocked.

S307, the first wireless earphone determines that the voice data has a missing voice segment when the first lowest volume does not match the second lowest volume.

S308, the first wireless earphone determines that the microphone of the first wireless earphone is blocked in response to detecting that the voice data has the missing voice segment.

It can be seen that, in the implementation of the present disclosure, the first wireless earphone first collects through the microphone of the first wireless earphone the voice data. The first wireless earphone then detects whether the voice data has the missing voice segment. Finally, the first wireless earphone determines that the microphone of the first wireless earphone is blocked in response to detecting that the voice data has the missing voice segment. As such the first wireless earphone acquires through the microphone the voice data, and can determine that the microphone of the first wireless earphone is blocked quickly and accurately by analyzing whether the voice data is intermittent, that is, by analyzing existence of the missing voice segment, which is beneficial to improve convenience of blocking detection. Moreover, due to universality of the voice data, detecting blocking by collecting the voice data is beneficial to improve time flexibility of blocking detection. In addition, the entire detecting process is performed by the wireless earphone autonomously, which realizes automatic blocking detection of the wireless earphone microphone. In the meantime, blocking of the microphone can be detected without increasing a hardware structure, which expands functions of the wireless earphone and improves intelligence of blocking detection.

In addition, when the microphone collects audio data, since the volume of sound needs to be within a certain volume range and the user itself speaks intermittently, both of these two situations can lead to voice segments. Therefore when the voice data collected is analyzed, all voice segments need to be screened out accurately by constraining a filtering condition using a time length of an interval and existence of voice information. Furthermore, based on practical voice analysis, a voice segment due to other than intermittent characteristics of the user during speaking is further filtered out. Finally, whether the voice data has the missing voice segment caused by blocking is detected. In this way, accuracy of blocking detection can be improved.

Moreover, the first wireless earphone can obtain the at least one voice segment group based on semantics analysis, accurately calculate the first lowest volume of the voice data according to the lowest volume of the each voice segment group, and then compare the first lowest volume with the second lowest volume directly. As such, the microphone can be determined to be blocked accurately and accuracy of blocking detection can be improved.

Figure 4:
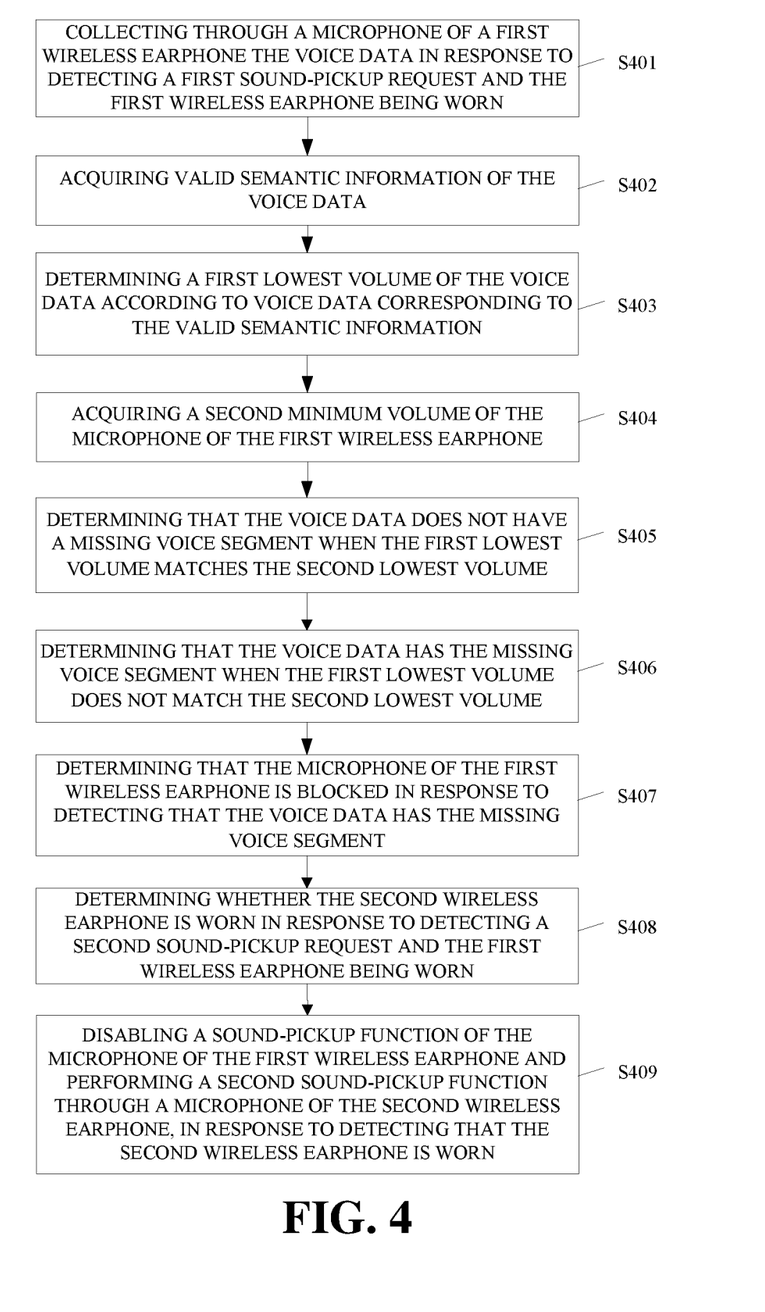
FIG. 4 is a schematic flowchart of a method for detecting blocking of a microphone according to other implementations.

Similar to implementations illustrated in FIG. 2, FIG. 4 is a schematic flowchart of a method for detecting blocking of a microphone according to implementations. As illustrated in FIG. 4, the method for detecting blocking of a microphone includes the following.

S401, a first wireless earphone collects through a microphone of the first wireless earphone the voice data in response to detecting a first sound-pickup request and the first wireless earphone being worn.

S402, the first wireless earphone acquires valid semantic information of the voice data.

S403, the first wireless earphone determines a first lowest volume of the voice data according to voice data corresponding to the valid semantic information, where the first minimum volume is indicative of an actual sound-pickup capability of the microphone of the first wireless earphone.

S404, the first wireless earphone acquires a second minimum volume of the microphone of the first wireless earphone, where the second minimum volume is indicative of a reference sound-pickup capability of the microphone of the first wireless earphone when the microphone is not blocked.

S405, the first wireless earphone determines that the voice data has a missing voice segment when the first lowest volume does not match the second lowest volume.

S406, the first wireless earphone determines that the voice data does not have the missing voice segment when the first lowest volume matches the second lowest volume.

S407, the first wireless earphone determines that the microphone of the first wireless earphone is blocked in response to detecting that the voice data has the missing voice segment.

S408, the first wireless earphone determines whether the second wireless earphone is worn in response to detecting a second sound-pickup request and the first wireless earphone being worn.

S409, the first wireless earphone disables a sound-pickup function of the microphone of the first wireless earphone and performs a second sound-pickup function through a microphone of the second wireless earphone, in response to detecting that the second wireless earphone is worn.

It can be seen that, in implementations of the present disclosure, the first wireless earphone first collects through the microphone of the first wireless earphone the voice data. The first wireless earphone then detects whether the voice data has the missing voice segment. Finally, the first wireless earphone determines that the microphone of the first wireless earphone is blocked in response to detecting that the voice data has the missing voice segment. So the first wireless earphone acquires through the microphone the voice data, and can determine that the microphone of the first wireless earphone is blocked quickly and accurately by analyzing whether the voice data is intermittent that is by analyzing existence of the missing voice segment, which is beneficial to improve convenience of blocking detection. Moreover, due to universality of the voice data, detecting blocking by collecting the voice data is beneficial to improve time flexibility of blocking detection. In addition, the entire detecting process is performed by the wireless earphone autonomously, which realizes automatic blocking detection of the wireless earphone microphone. In the meantime, blocking of the microphone can be detected without increasing a hardware structure, which expands functions of the wireless earphone and improves intelligence of blocking detection.

In addition, the valid semantic information includes part of the voice data with the lowest volume that can be collected by the microphone, the first wireless earphone can calculate the first lowest volume, which corresponds to an actual sound-pickup capability of the microphone during this collecting process, by processing the voice data. The first wireless earphone compares the second lowest volume corresponding to the reference sound-pickup capability of the microphone when the microphone is not blocked with the first lowest volume. As such, the microphone can be determined to be blocked accurately.

Moreover, when a distance between a sound source and the microphone is changing, a volume of the voice data collected by the microphone will be affected by the changing distance. Therefore, in order to avoid an error caused by the changing distance between the sound source and the microphone, the first wireless earphone can accurately determine a scene in which the distance is relatively constant by detecting whether the first wireless earphone is worn, thereby reducing a detection error and improving accuracy of blocking detection.

Figure 5:
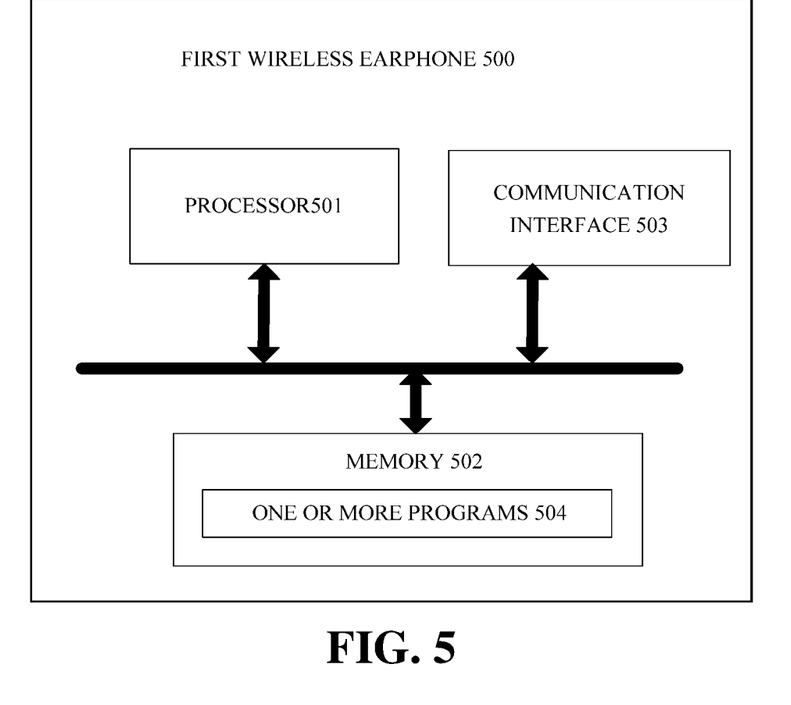
FIG. 5 is a schematic structural diagram of a first wireless earphone according to implementations.

Similar to implementations illustrated in FIG. 2, FIG. 3, and FIG. 4, FIG. 5 is a schematic structural diagram of a first wireless earphone 500 according to implementations. As illustrated in FIG. 5, the first wireless earphone 500 includes a processor 501, a memory 502, a communication interface 503, and one or more programs 504 stored in the memory 502 and executed by the processor 501. The one or more programs 504 include instructions for performing the following operations.

Voice data is collected through a microphone of the first wireless earphone. Whether the voice data has a missing voice segment is detected. The microphone (e.g., microphone-hole) of the first wireless earphone is determined to be blocked in response to detecting that the voice data has the missing voice segment.

It can be seen that, in the implementation of the present disclosure, the first wireless earphone first collects through the microphone of the first wireless earphone the voice data. The first wireless earphone then detects whether the voice data has the missing voice segment. Finally, the first wireless earphone determines that the microphone of the first wireless earphone is blocked in response to detecting that the voice data has the missing voice segment. As such the first wireless earphone acquires through the microphone the voice data, and can determine that the microphone of the first wireless earphone is blocked quickly and accurately by analyzing whether the voice data is intermittent, that is, by analyzing existence of the missing voice segment, which is beneficial to improve convenience of blocking detection. Moreover, due to universality of the voice data, detecting blocking by collecting the voice data is beneficial to improve time flexibility of blocking detection. In addition, the entire detecting process is performed by the wireless earphone autonomously, which realizes automatic blocking detection of the wireless earphone microphone. In the meantime, blocking of the microphone can be detected without increasing a hardware structure, which expands functions of the wireless earphone and improves intelligence of blocking detection.

As an implementation, in terms of detecting whether the voice data has the missing voice segment, the one or more programs 504 include instructions for performing the following operations. Multiple voice segments in the voice data are determined, where an interval between any two adjacent voice segments is longer than a preset time length, and voice data corresponding to the interval between the any two adjacent voice segments has no valid voice information. Whether the voice data has the missing voice segment is determined according to semantic coherence of the multiple voice segments.

As an implementation, in terms of detecting whether the voice data has the missing voice segment according to the semantic coherence of the multiple voice segments, the one or more programs 504 include instructions for performing the following operations. At least one voice segment group with missing semantics is acquired from the multiple voice segments, where each of the at least one voice segment group includes two adjacent voice segments. A lowest volume of voice data in each voice segment group is determined. A first minimum volume of the voice data collected through the microphone is determined according to the lowest volume of the voice data in the each voice segment group, where the first minimum volume is indicative of an actual sound-pickup capability of the microphone of the first wireless earphone. A second minimum volume of the microphone of the first wireless earphone is acquired, where the second minimum volume is indicative of a reference sound-pickup capability of the microphone of the first wireless earphone when the microphone is not blocked. The voice data is determined to have the missing voice segment when the first lowest volume does not match the second lowest volume. The voice data is determined to have no missing voice segment when the first lowest volume matches the second lowest volume.

As an implementation, in terms of detecting whether the voice data has the missing voice segment, the one or more programs 504 include instructions for performing the following operations. Valid semantic information of the voice data is acquired. A first lowest volume of the voice data is determined according to voice data corresponding to the valid semantic information, where the first minimum volume is indicative of an actual sound-pickup capability of the microphone of the first wireless earphone. A second minimum volume of the microphone of the first wireless earphone is acquired, where the second minimum volume is indicative of a reference sound-pickup capability of the microphone of the first wireless earphone when the microphone is not blocked. The voice data is determined to have the missing voice segment when the first lowest volume does not match the second lowest volume. The voice data is determined to have no missing voice segment when the first lowest volume matches the second lowest volume.

As an implementation, in terms of collecting through the microphone of the first wireless earphone the voice data, the one or more programs 504 include instructions for performing the following operations. The voice data is collected through the microphone of the first wireless earphone in response to detecting a first sound-pickup request and the first wireless earphone being worn.

As an implementation, the one or more programs 504 further include instructions for performing the following operations. After the microphone of the first wireless earphone is determined to be blocked in response to detecting that the voice data has the missing voice segment, whether the second wireless earphone is worn is determined in response to detecting a second sound-pickup request and the first wireless earphone being worn. A sound-pickup function of the microphone of the first wireless earphone is disabled and a second sound-pickup function is performed through a microphone of the second wireless earphone, in response to detecting that the second wireless earphone is worn.

As an implementation, the one or more programs 504 further include instructions for performing the following operations. A third distance between the first wireless earphone and the mobile terminal and a fourth distance between the first wireless earphone and the second wireless earphone are acquired in response to detecting that the second wireless earphone is not worn. a notification message is sent to the mobile terminal a notification message when the third distance is less than the fourth distance, where the notification message is used to notify the mobile terminal to perform the second sound-pickup function through a microphone of the mobile terminal.

As an implementation, the voice data includes voice data with a change in volume output by a target sound source, and the target sound source comprises a user or other audio playback devices.

As an implementation, the voice segment includes a word, a phrase, or a sentence.

The foregoing solution of the implementations of the present disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementations should not be considered as beyond the scope of the present disclosure.

According to the implementations of the present disclosure, functional units may be divided for the first wireless earphone in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations is schematic, and is merely a logical function division, and there may be other division manners in actual implementation.

Figure 6:
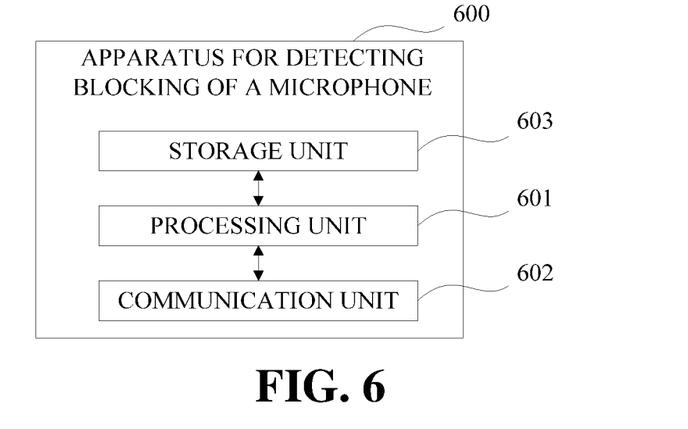
FIG. 6 is a block diagram illustrating functional units of an apparatus for detecting blocking of a microphone according to implementations.

FIG. 6 is a block diagram illustrating functional units of an apparatus 600 for detecting blocking of a microphone according to implementations. The apparatus 600 for detecting blocking of a microphone is applicable to a first wireless earphone and the first wireless earphone is in communication with a mobile terminal and the second wireless earphone. The apparatus 600 for detecting blocking of a microphone includes a processing unit 601 and a communication unit 602.

The processing unit 601 is configured to collect through a microphone of the first wireless earphone voice data; detect whether the voice data has a missing voice segment; determine that the microphone of the first wireless earphone is blocked in response to detecting that the voice data has the missing voice segment.

The apparatus 600 for detecting blocking of a microphone can further include a storage unit 603 configured to store program codes and data of the mobile terminal. The processing unit 601 may be a processor, the communication unit 602 may be a touch screen or a transceiver, and the storage unit 603 may be a memory.

It can be seen that, in the implementation of the present disclosure, the first wireless earphone first collects through the microphone of the first wireless earphone the voice data. The first wireless earphone then detects whether the voice data has the missing voice segment. Finally, the first wireless earphone determines that the microphone of the first wireless earphone is blocked in response to detecting that the voice data has the missing voice segment. As such the first wireless earphone acquires through the microphone the voice data, and can determine that the microphone of the first wireless earphone is blocked quickly and accurately by analyzing whether the voice data is intermittent, that is, by analyzing existence of the missing voice segment, which is beneficial to improve convenience of blocking detection. Moreover, due to universality of the voice data, detecting blocking by collecting the voice data is beneficial to improve time flexibility of blocking detection. In addition, the entire detecting process is performed by the wireless earphone autonomously, which realizes automatic blocking detection of the wireless earphone microphone. In the meantime, blocking of the microphone can be detected without increasing a hardware structure, which expands functions of the wireless earphone and improves intelligence of blocking detection.

As an implementation, in terms of detecting whether the voice data has the missing voice segment, the processing unit 601 is configured to: determine multiple voice segments in the voice data, where an interval between any two adjacent voice segments is longer than a preset time length, and voice data corresponding to the interval between the any two adjacent voice segments has no valid voice information; detect whether the voice data has the missing voice segment according to semantic coherence of the multiple voice segments.

As an implementation, in terms of detecting whether the voice data has the missing voice segment according to the semantic coherence of the multiple voice segments, the processing unit 601 is configured to: acquire at least one voice segment group with missing semantics from the multiple voice segments, where each of the at least one voice segment group includes two adjacent voice segments; determine a lowest volume of voice data in each voice segment group; determine a first minimum volume of the voice data collected through the microphone according to the lowest volume of the voice data in the each voice segment group, where the first minimum volume is indicative of an actual sound-pickup capability of the microphone of the first wireless earphone; acquire a second minimum volume of the microphone of the first wireless earphone, where the second minimum volume is indicative of a reference sound-pickup capability of the microphone of the first wireless earphone when the microphone is not blocked; determine that the voice data has the missing voice segment when the first lowest volume does not match the second lowest volume; determine that the voice data does not have the missing voice segment when the first lowest volume matches the second lowest volume.

As an implementation, in terms of detecting whether the voice data has the missing voice segment, the processing unit 601 is configured to: acquire valid semantic information of the voice data; determine a first lowest volume of the voice data according to voice data corresponding to the valid semantic information, where the first minimum volume is indicative of an actual sound-pickup capability of the microphone of the first wireless earphone; acquire a second minimum volume of the microphone of the first wireless earphone, where the second minimum volume is indicative of a reference sound-pickup capability of the microphone of the first wireless earphone when the microphone is not blocked; determine that the voice data has the missing voice segment when the first lowest volume does not match the second lowest volume; determine that the voice data does not have the missing voice segment when the first lowest volume matches the second lowest volume.

As an implementation, in terms of collecting through the microphone of the first wireless earphone the voice data, the processing unit 601 is configured to collect through the microphone of the first wireless earphone the voice data in response to detecting a first sound-pickup request and the first wireless earphone being worn.

As an implementation, the processing unit 601 is configured to: after determining that the microphone of the first wireless earphone is blocked in response to detecting that the voice data has the missing voice segment, determine whether the second wireless earphone is worn in response to detecting a second sound-pickup request and the first wireless earphone being worn; disable a sound-pickup function of the microphone of the first wireless earphone and perform a second sound-pickup function through a microphone of the second wireless earphone, in response to detecting that the second wireless earphone is worn.

As an implementation, the processing unit 601 is configured to: acquire a third distance between the first wireless earphone and the mobile terminal and a fourth distance between the first wireless earphone and the second wireless earphone, in response to detecting that the second wireless earphone is not worn; send to the mobile terminal a notification message when the third distance is less than the fourth distance, where the notification message is used to notify the mobile terminal to perform the second sound-pickup function through a microphone of the mobile terminal.

As an implementation, the voice data includes voice data with a change in volume output by a target sound source, and the target sound source comprises a user or other audio playback devices.

As an implementation, the voice segment includes a word, a phrase, or a sentence.

Implementations of the present disclosure also provides a method for detecting blocking of a microphone, the method for detecting blocking of a microphone is applicable to a first wireless earphone that is in communication with a second wireless earphone and a mobile terminal. The method includes: collecting through a microphone of the first wireless earphone voice data; determining a first minimum volume of the voice data collected through the microphone, where the first minimum volume is indicative of an actual sound-pickup capability of the microphone of the first wireless earphone; determining that the microphone of the first wireless earphone is blocked when the first lowest volume does not match a second lowest volume, where the second minimum volume is indicative of a reference sound-pickup capability of the microphone of the first wireless earphone when the microphone is not blocked.

As an implementation, determining a first minimum volume of the voice data collected through the microphone comprises: determining a plurality of voice segments in the voice data, where an interval between any two adjacent voice segments is longer than a preset time length, and voice data corresponding to the interval between the any two adjacent voice segments has no valid voice information; acquiring at least one voice segment group with missing semantics from the plurality of voice segments, where each of the at least one voice segment group comprises two adjacent voice segments; determining a lowest volume of voice data in each voice segment group; determining a first minimum volume of the voice data collected through the microphone according to the lowest volume of the voice data in the each voice segment group.

As an implementation, determining a first minimum volume of the voice data collected through the microphone comprises: acquiring valid semantic information of the voice data; determining a first lowest volume of the voice data according to voice data corresponding to the valid semantic information.

As an implementation, collecting through the microphone of the first wireless earphone the voice data comprises: collecting through the microphone of the first wireless earphone the voice data in response to detecting a first sound-pickup request and the first wireless earphone being worn.

As an implementation, the method further includes after determining that the microphone of the first wireless earphone is blocked, determining whether the second wireless earphone is worn in response to detecting a second sound-pickup request and the first wireless earphone being worn; disabling a sound-pickup function of the microphone of the first wireless earphone and performing a second sound-pickup function through a microphone of the second wireless earphone, in response to detecting that the second wireless earphone is worn.

As an implementation, the method further includes: acquiring a third distance between the first wireless earphone and the mobile terminal and a fourth distance between the first wireless earphone and the second wireless earphone, in response to detecting that the second wireless earphone is not worn; sending to the mobile terminal a notification message when the third distance is less than the fourth distance, where the notification message is used to notify the mobile terminal to perform the second sound-pickup function through a microphone of the mobile terminal.

As an implementation, the voice data comprises voice data with a change in volume output by a target sound source, and the target sound source comprises a user or other audio playback devices.

As an implementation, the voice segment comprises a word, a phrase, or a sentence.

Implementations further provide a non-transitory computer storage medium. The computer storage medium is configured to store computer programs for electronic data interchange (EDI) which, when executed, are operable with a computer to perform some or all operations of any one of the foregoing method implementations. The computer includes an electronic device.

Implementations further provide a computer program product. The computer program product includes a non-transitory computer-readable storage medium that stores computer programs. The computer programs are operable with a computer to execute some or all operations of any one of the foregoing method implementations. The computer program product may be a software installation package. The computer includes an electronic device.

It is to be noted that, for the sake of simplicity, the foregoing method implementations are described as a series of action combinations, however, it will be appreciated by those skilled in the art that the present disclosure is not limited by the sequence of actions described. According to implementations, certain steps or operations may be performed in other order or simultaneously. Besides, it will be appreciated by those skilled in the art that the implementations described in the specification are exemplary implementations and the actions and modules involved are not necessarily essential to the present disclosure.

In the above implementations, description of each implementation has its own emphasis. For details not described in one implementation, reference can be made to related part in other implementations.

It will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc, to execute some or all operations of the methods described in various implementations. The above storage medium may include various kinds of media that can store program codes, such as a universal serial bus (USB) flash disk, a read only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware. The program may be stored in a computer-readable memory, which may include a flash memory, a ROM, a RAM, a magnetic disk, an optical disk, and so on. While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for detecting blocking of a microphone, applicable to a first wireless earphone that is in communication with a second wireless earphone and a mobile terminal, and the method comprising:
collecting through a microphone of the first wireless earphone voice data;
detecting whether the voice data has a missing voice segment; and
determining that the microphone of the first wireless earphone is blocked in response to detecting that the voice data has the missing voice segment,
wherein detecting whether the voice data has the missing voice segment comprises one of:
determining a plurality of voice segments in the voice data, wherein an interval between any two adjacent voice segments is longer than a preset time length, and voice data corresponding to the interval between the any two adjacent voice segments has no valid voice information; and detecting whether the voice data has the missing voice segment according to semantic coherence of the plurality of voice segments; or
acquiring valid semantic information of the voice data; determining a first lowest volume of the voice data according to voice data corresponding to the valid semantic information, wherein the first minimum volume is indicative of an actual sound-pickup capability of the microphone of the first wireless earphone; acquiring a second minimum volume of the microphone of the first wireless earphone, wherein the second minimum volume is indicative of a reference sound-pickup capability of the microphone of the first wireless earphone when the microphone is not blocked; determining that the voice data has the missing voice segment when the first lowest volume does not match the second lowest volume; and determining that the voice data does not have the missing voice segment when the first lowest volume matches the second lowest volume.

2. The method of claim 1, wherein detecting whether the voice data has the missing voice segment according to the semantic coherence of the plurality of voice segments comprises:
acquiring at least one voice segment group with missing semantics from the plurality of voice segments, wherein each of the at least one voice segment group comprises two adjacent voice segments;
determining a lowest volume of voice data in each voice segment group;
determining a first minimum volume of the voice data collected through the microphone according to the lowest volume of the voice data in the each voice segment group, wherein the first minimum volume is indicative of an actual sound-pickup capability of the microphone of the first wireless earphone;
acquiring a second minimum volume of the microphone of the first wireless earphone, wherein the second minimum volume is indicative of a reference sound-pickup capability of the microphone of the first wireless earphone when the microphone is not blocked;
determining that the voice data has the missing voice segment when the first lowest volume does not match the second lowest volume; and
determining that the voice data does not have the missing voice segment when the first lowest volume matches the second lowest volume.

3. The method of claim 1, wherein collecting through the microphone of the first wireless earphone the voice data comprises:
collecting through the microphone of the first wireless earphone the voice data in response to detecting a first sound-pickup request and the first wireless earphone being worn.

4. The method of claim 3, further comprising:
after determining that the microphone of the first wireless earphone is blocked in response to detecting that the voice data has the missing voice segment,
determining whether the second wireless earphone is worn in response to detecting a second sound-pickup request and the first wireless earphone being worn; and
disabling a sound-pickup function of the microphone of the first wireless earphone and performing a second sound-pickup function through a microphone of the second wireless earphone, in response to detecting that the second wireless earphone is worn.

5. The method of claim 4, further comprising:
acquiring a third distance between the first wireless earphone and the mobile terminal and a fourth distance between the first wireless earphone and the second wireless earphone, in response to detecting that the second wireless earphone is not worn; and
sending to the mobile terminal a notification message when the third distance is less than the fourth distance, wherein the notification message is used to notify the mobile terminal to perform the second sound-pickup function through a microphone of the mobile terminal.

6. The method of claim 5, wherein the voice data comprises voice data with a change in volume output by a target sound source, and the target sound source comprises a user or other audio playback devices.

7. The method of claim 6, wherein the voice segment comprises a word, a phrase, or a sentence.

8. A first microphone comprising a processor, a memory, and one or more programs stored in the memory and executed by the processor, wherein the one or more programs comprise instructions for performing actions comprising:
collecting through a microphone of the first wireless earphone voice data;
detecting whether the voice data has a missing voice segment; and
determining that the microphone of the first wireless earphone is blocked in response to detecting that the voice data has the missing voice segment,
wherein detecting whether the voice data has the missing voice segment comprises one of:
determining a plurality of voice segments in the voice data, wherein an interval between any two adjacent voice segments is longer than a preset time length, and voice data corresponding to the interval between the any two adjacent voice segments has no valid voice information; and detecting whether the voice data has the missing voice segment according to semantic coherence of the plurality of voice segments; or
acquiring valid semantic information of the voice data; determining a first lowest volume of the voice data according to voice data corresponding to the valid semantic information, wherein the first minimum volume is indicative of an actual sound-pickup capability of the microphone of the first wireless earphone; acquiring a second minimum volume of the microphone of the first wireless earphone, wherein the second minimum volume is indicative of a reference sound-pickup capability of the microphone of the first wireless earphone when the microphone is not blocked; determining that the voice data has the missing voice segment when the first lowest volume does not match the second lowest volume; and determining that the voice data does not have the missing voice segment when the first lowest volume matches the second lowest volume.

9. The first microphone of claim 8, wherein in terms of detecting whether the voice data has the missing voice segment according to the semantic coherence of the plurality of voice segments, the one or more programs comprise instructions for performing actions comprising:
acquiring at least one voice segment group with missing semantics from the plurality of voice segments, wherein each of the at least one voice segment group comprises two adjacent voice segments;
determining a lowest volume of voice data in each voice segment group;
determining a first minimum volume of the voice data collected through the microphone according to the lowest volume of the voice data in the each voice segment group, wherein the first minimum volume is indicative of an actual sound-pickup capability of the microphone of the first wireless earphone;
acquiring a second minimum volume of the microphone of the first wireless earphone, wherein the second minimum volume is indicative of a reference sound-pickup capability of the microphone of the first wireless earphone when the microphone is not blocked;
determining that the voice data has the missing voice segment when the first lowest volume does not match the second lowest volume; and
determining that the voice data does not have the missing voice segment when the first lowest volume matches the second lowest volume.

10. The first microphone of claim 8, wherein in terms of collecting through the microphone of the first wireless earphone the voice data, the one or more programs comprise instructions for performing actions comprising:
collecting through the microphone of the first wireless earphone the voice data in response to detecting a first sound-pickup request and the first wireless earphone being worn.

11. The first microphone of claim 10, wherein the one or more programs further comprise instructions for performing actions comprising:
after determining that the microphone of the first wireless earphone is blocked in response to detecting that the voice data has the missing voice segment,
determining whether the second wireless earphone is worn in response to detecting a second sound-pickup request and the first wireless earphone being worn; and
disabling a sound-pickup function of the microphone of the first wireless earphone and performing a second sound-pickup function through a microphone of the second wireless earphone, in response to detecting that the second wireless earphone is worn.

12. The first microphone of claim 11, wherein the one or more programs further comprise instructions for performing actions comprising:
acquiring a third distance between the first wireless earphone and the mobile terminal and a fourth distance between the first wireless earphone and the second wireless earphone, in response to detecting that the second wireless earphone is not worn; and
sending to the mobile terminal a notification message when the third distance is less than the fourth distance, wherein the notification message is used to notify the mobile terminal to perform the second sound-pickup function through a microphone of the mobile terminal.

13. A non-transitory computer-readable storage medium configured to store computer programs for electronic data interchange (EDI) which, when executed, are operable with a computer to perform actions comprising:
collecting through a microphone of the first wireless earphone voice data;
determining a first minimum volume of the voice data collected through the microphone, wherein the first minimum volume is indicative of an actual sound-pickup capability of the microphone of the first wireless earphone; and
determining that the microphone of the first wireless earphone is blocked when the first lowest volume does not match a second lowest volume, wherein the second minimum volume is indicative of a reference sound-pickup capability of the microphone of the first wireless earphone when the microphone is not blocked.

14. The non-transitory computer-readable storage medium of claim 13, wherein in terms of determining the first minimum volume of the voice data collected through the microphone, the computer programs, when executed, are operable with a computer to perform actions comprising:
determining a plurality of voice segments in the voice data, wherein an interval between any two adjacent voice segments is longer than a preset time length, and voice data corresponding to the interval between the any two adjacent voice segments has no valid voice information;
acquiring at least one voice segment group with missing semantics from the plurality of voice segments, wherein each of the at least one voice segment group comprises two adjacent voice segments;
determining a lowest volume of voice data in each voice segment group; and
determining a first minimum volume of the voice data collected through the microphone according to the lowest volume of the voice data in the each voice segment group.

15. The non-transitory computer-readable storage medium of claim 13, wherein in terms of determining the first minimum volume of the voice data collected through the microphone, the computer programs, when executed, are operable with a computer to perform actions comprising:
acquiring valid semantic information of the voice data; and
determining a first lowest volume of the voice data according to voice data corresponding to the valid semantic information.

16. The non-transitory computer-readable storage medium of claim 13, wherein in terms of collecting through the microphone of the first wireless earphone the voice data, the computer programs, when executed, are operable with a computer to perform actions comprising:
collecting through the microphone of the first wireless earphone the voice data in response to detecting a first sound-pickup request and the first wireless earphone being worn.

* * * * *